(12) United States Patent
Hasunuma et al.

(10) Patent No.: US 11,701,772 B2
(45) Date of Patent: Jul. 18, 2023

(54) OPERATION PREDICTION SYSTEM AND OPERATION PREDICTION METHOD

(71) Applicant: KAWASAKI JUKOGYO KABUSHIKI KAISHA, Kobe (JP)

(72) Inventors: Hitoshi Hasunuma, Kobe (JP); Masayuki Enomoto, Kobe (JP); Jun Fujimori, Kobe (JP)

(*) Notice: Subject to any disclaimer, the term of this patent is extended or adjusted under 35 U.S.C. 154(b) by 656 days.

(21) Appl. No.: 16/620,590

(22) PCT Filed: Jun. 8, 2018

(86) PCT No.: PCT/JP2018/022087
§ 371 (c)(1),
(2) Date: Dec. 9, 2019

(87) PCT Pub. No.: WO2018/225862
PCT Pub. Date: Dec. 13, 2018

(65) Prior Publication Data
US 2020/0139539 A1    May 7, 2020

(30) Foreign Application Priority Data

Jun. 9, 2017  (JP) .................... 2017-114055

(51) Int. Cl.
*B25J 9/16*        (2006.01)
*G06N 20/00*    (2019.01)
(Continued)

(52) U.S. Cl.
CPC .......... *B25J 9/163* (2013.01); *B25J 9/1694* (2013.01); *G06N 3/08* (2013.01); *G06N 5/046* (2013.01); *G06N 20/00* (2019.01)

(58) Field of Classification Search
CPC ...... G06N 20/00; G06N 20/20; G06N 3/0454; G06N 3/08; G06N 3/088; G06N 3/0445;
(Continued)

(56) References Cited

U.S. PATENT DOCUMENTS

2010/0106982 A1    4/2010   Castelli et al.
2017/0028553 A1    2/2017   Tsuda et al.
(Continued)

FOREIGN PATENT DOCUMENTS

CN    101441442 A    5/2009
JP    H07-134605 A   5/1995
(Continued)

OTHER PUBLICATIONS

Aug. 28, 2018 Search Report issued in International Patent Application No. PCT/JP2018/022087.

*Primary Examiner* — Ajibola A Akinyemi (57) ABSTRACT

The automatic operation system includes a plurality of learned imitation models and a model selecting unit. The learned imitation models are constructed by machine learning of operation history data, the operation history data being classified into several groups by an automatic classification system algorithm, the operation history data of each group being learned by the imitation model corresponding to the group. The operation history data include data indicating a surrounding environment and data indicating an operation of an operator in the surrounding environment. The model selecting unit selects one imitation model from several imitation models based on a result of classifying data indicating a given surrounding environment by the automatic classification algorithm of the classification system. The automatic operation system inputs data indicating the surrounding environment to the imitation model selected by the model selecting unit to predict an operation of the operator with respect to the surrounding environment.

10 Claims, 7 Drawing Sheets

(51) Int. Cl.
*G06N 3/08* (2023.01)
*G06N 5/046* (2023.01)

(58) Field of Classification Search
CPC .......... G06N 5/04; G06N 20/10; G06N 3/006;
G06N 3/008; G06N 3/02; G06N 3/0472;
G06N 5/046; G06N 7/00
USPC ........................................................ 700/257
See application file for complete search history.

(56) References Cited

U.S. PATENT DOCUMENTS

| | | |
|---|---|---|
| 2017/0061329 A1* | 3/2017 | Kobayashi .............. G06N 20/00 |
| 2017/0083623 A1 | 3/2017 | Habibian et al. |
| 2018/0099407 A1 | 4/2018 | Nakamura et al. |
| 2020/0014761 A1* | 1/2020 | Kawaai ................... H04L 67/12 |

FOREIGN PATENT DOCUMENTS

| | | |
|---|---|---|
| JP | 2017-030137 A | 2/2017 |
| WO | 2016/189924 A1 | 12/2016 |

* cited by examiner

OPERATION PREDICTION SYSTEM AND OPERATION PREDICTION METHOD

BACKGROUND OF THE INVENTION

1. Field of the Invention

The present invention relates to a system and method for predicting a human operation by machine learning.

2. Description of the Related Art

Conventionally, a control object such as a robot and a plant is controlled by a program created in advance to perform a desired operation.

For example, Patent Document 1 (Japanese Patent Laid-Open No. 1995-134605) discloses a configuration in which a control unit of a robot includes a CPU, a ROM in which a program for controlling the robot is stored, and a RAM in which a program written in a robot language for the robot to execute an operation is stored.

SUMMARY OF THE INVENTION

In the conventional configuration, a program for moving a robot or the like is realized by a human understanding of an operation and programming a method of operating the robot or the like. However, in many cases, such a method requires time to create a program and adjust the program.

Further, in order to meet a need to automatically make a robot perform an operation involving contact with parts or the like on behalf of a human, or to automate a driving operation performed in a plant in accordance with a situation visually observed by an operator, it is sometimes necessary to realize an operation method based on the experience and intuition of a skilled person by a program, and therefore, a lot of trial and error is required. In addition, although there is an approach of facilitating programming by carrying out the work of clarifying human experience and intuition by language or the like, there are cases where nuances are not correctly expressed even if the language is put into use, and therefore, it is often impossible to realize good control by the method of programming.

The present invention has been made in view of the circumstances described above, and an object of the present invention is to efficiently realize automation of an operation performed by a skilled person.

Problems to be solved by the present invention are as described above, and next, means for solving the problems and effects thereof will be described.

According to a first aspect of the present invention, an operation prediction system with the following configuration is provided. That is, the operation prediction system includes a plurality of learned operation prediction models and a model selecting unit. The operation prediction models are constructed by machine learning of learning operation case data, the learning operation case data being classified into a plurality of groups by an automatic classification algorithm, the learning operation case data belonging to each group being learned by the operation prediction model corresponding to the group. The learning operation case data include data indicating a surrounding environment and data indicating a human operation in the surrounding environment. The model selecting unit selects one operation prediction model from a plurality of the operation prediction models based on a result of classifying data indicating a given surrounding environment by the automatic classification algorithm. The data indicating the surrounding environment are input to the operation prediction model selected by the model selecting unit to predict a human operation with respect to the surrounding environment.

According to a second aspect of the present invention, the following operation prediction method is provided. That is, the operation prediction method includes a classification step, a learning step, a model selecting step, and a prediction step. In the classification step, learning operation case data including data indicating a surrounding environment and data indicating a human operation in the surrounding environment are classified into a plurality of groups by an automatic classification algorithm. In the learning step, on a computer having a plurality of operation prediction models, each of the operation prediction models corresponding to the group are made to learn the learning operation case data belonging to each group classified in the classification step, by machine learning, to construct a plurality of learned operation prediction models. In the model selecting step, one operation prediction model is selected from the plurality of the operation prediction models based on a result of classifying data indicating a given surrounding environment by the automatic classification algorithm. In the prediction step, data indicating the surrounding environment are input to the operation prediction model selected in the model selecting step to predict a human operation with respect to the surrounding environment.

Accordingly, automation can be realized in a short time and at a low cost in a form that properly incorporates skilled human techniques and skills, which may not be suitable for putting into words or expressing in a program. In addition, by limiting the object to be learned per operation prediction model, efficient learning can be performed.

According to the present invention, it is possible to efficiently realize the automation of the operation performed by a skilled person.

DETAILED DESCRIPTION OF THE EMBODIMENTS

Figure 1:
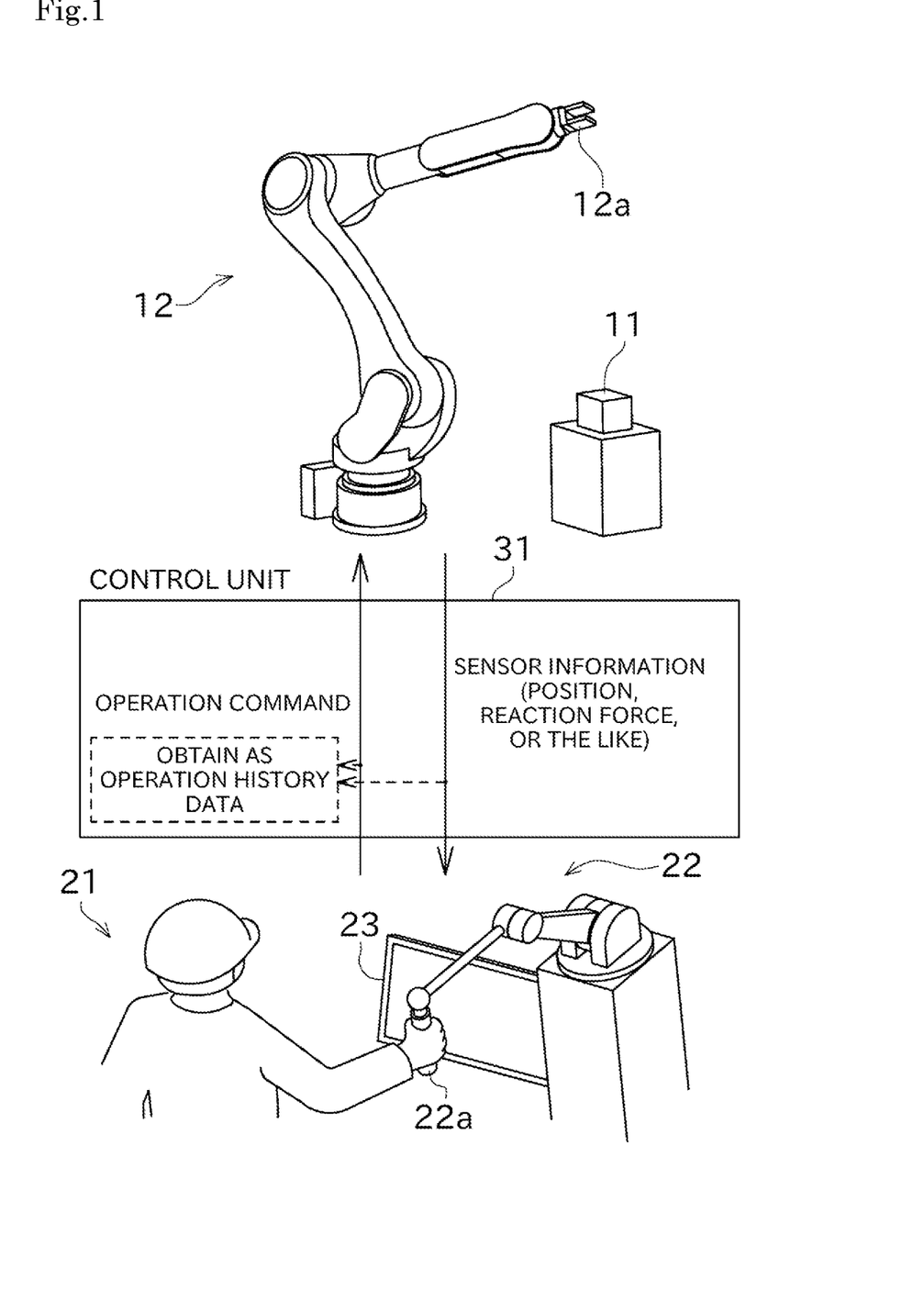
FIG. 1 is a conceptual diagram showing a configuration for collecting operation history data related to an operation by a robot arm in a master-slave robot remote control system.
Figure 2:
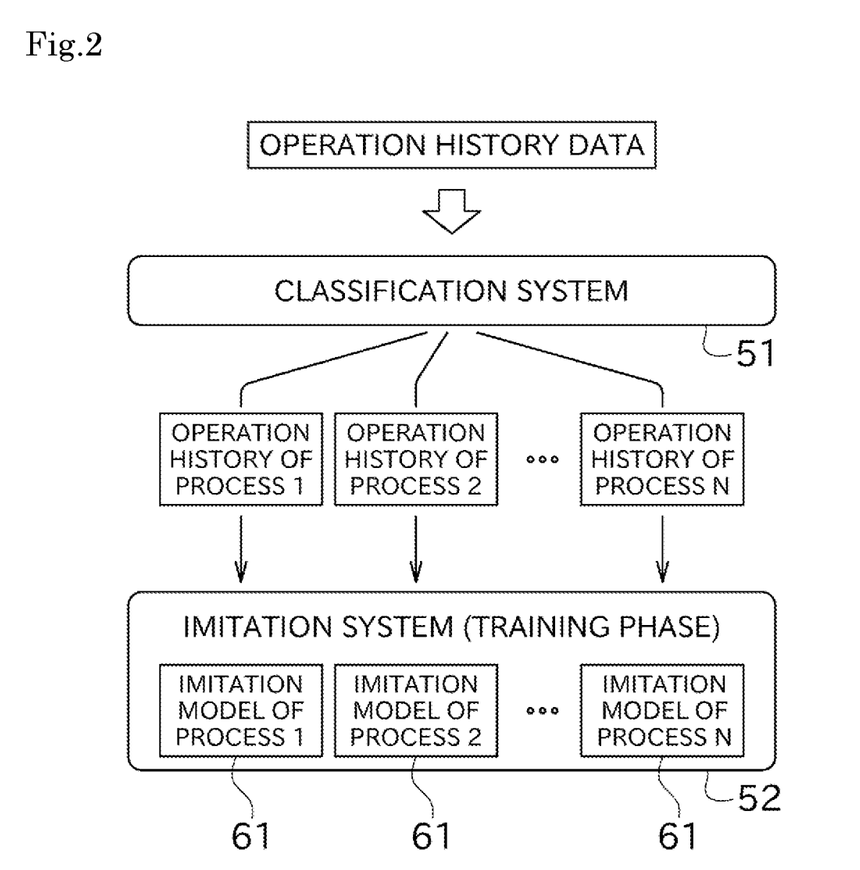
FIG. 2 is a conceptual diagram showing work of classifying operation history data and making corresponding imitation models learn them.
Figure 3:
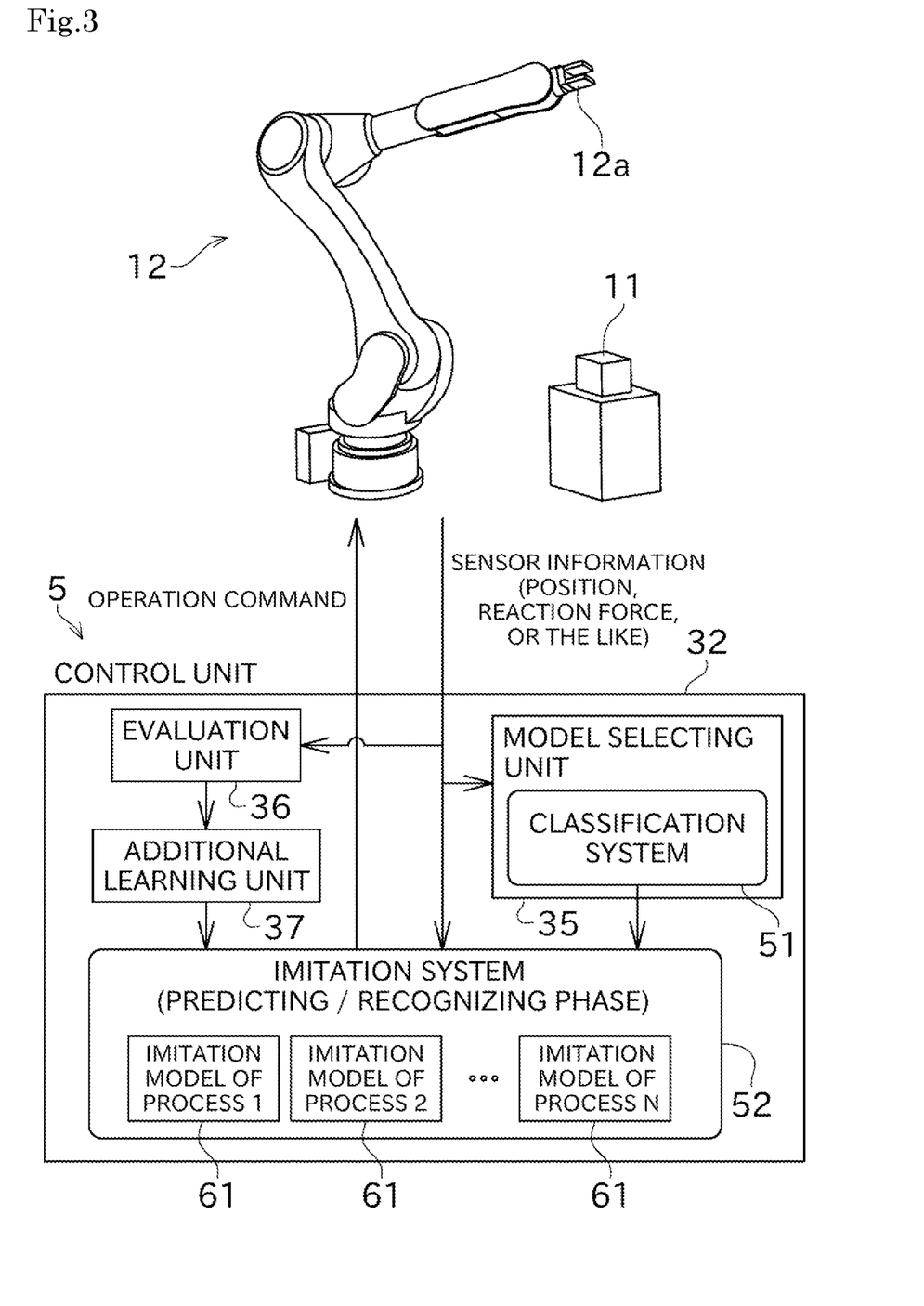
FIG. 3 is a block diagram showing an automatic operation system of the first embodiment.
Figure 4:
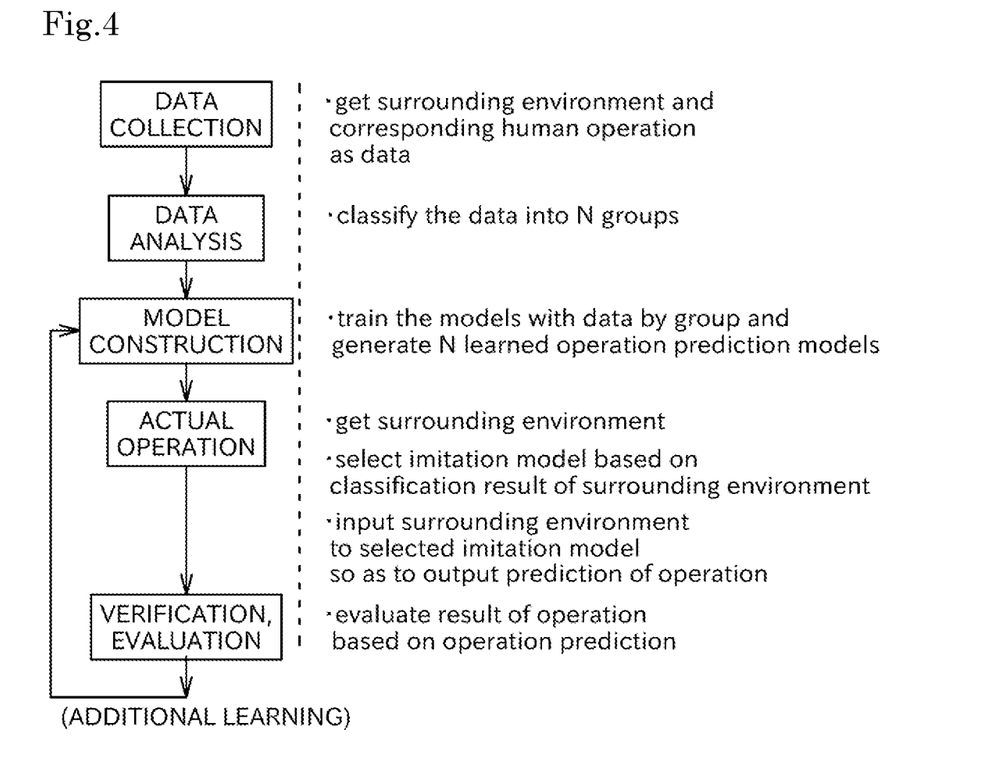
FIG. 4 is a step flow diagram showing work of constructing and operating the automatic operation system.

Next, an embodiment of the present invention will be described with reference to drawings. FIG. 1 is a conceptual diagram showing a configuration for collecting operation history data related to an operation by a robot arm 12 in a master-slave robot remote control system. FIG. 2 is a conceptual diagram showing work of classifying operation history data and making corresponding imitation models 61 learn them. FIG. 3 is a block diagram showing an automatic operation system 5 of the first embodiment. FIG. 4 is a step flow diagram showing work of constructing and operating the automatic operation system 5.

FIG. 1 shows a state in which an operator 21 manually remotely controls the robot arm 12 in the master-slave robot remote control system to acquire an operation history of performing various operations on a workpiece 11 in order to realize automatic operation of the robot arm 12.

In this robot remote control system, the operator 21 can give an instruction to the robot arm 12 as a slave arm by operating a master arm 22 disposed at an operation location.

The master arm 22 is configured as a known multi-joint robot. Each joint of the master arm 22 is provided with an actuator (for example, an electric motor) (not shown) for driving an arm unit around the joint.

An operation piece 22a capable of being hold and operated by the operator 21 is provided at a distal end of an arm unit of the master arm 22. The master arm 22 is provided with an operation force detection sensor (not shown), and the operation force detection sensor can detect an operation force applied to the master arm 22 by the operator 21. The master arm 22 moves by the combined force of the operating force applied by the operator 21 and the force applied by the actuator described above.

Like the master arm 22, the robot arm 12 is configured as a known multi-joint robot. An end effector 12a acting in direct contact with the workpiece 11 is attached to the distal end portion of the robot arm 12.

The robot arm 12 is provided with a reaction force detection sensor (not shown), and the reaction force detection sensor can detect a reaction force received when the end effector comes into contact with the external environment (specifically, the workpiece 11). The robot arm 12 moves by a combined force of a reaction force applied from an external environment and a force applied by an actuator (not shown) for driving each joint of the robot arm 12.

The robot arm 12 and the master arm 22 can input and output various signals to and from a control unit 31. The control unit 31 is configured by a known computer, and includes a CPU, a ROM, a RAM, an HDD, and the like. In the HDD or the like, various kinds of software are stored by performing an installation operation in advance. The software includes a control application for controlling the robot arm 12 and the master arm 22, and a data collection application for obtaining data (operation history data described after) used for learning in the present invention.

The control unit 31 drives the actuator of the robot arm 12 so as to trace the movement of the master arm 22 by the operation force of the operator 21, and drives the actuator of the master arm 22 so as to transmit the reaction force received by the robot arm 12. As a result, interactive operation is realized, and the operator 21 can remotely operate the robot arm 12 in real time using the master arm 22 while feeling the force sense which is pseudo-presented through the master arm 22.

A camera (not shown) is installed in the work area of the robot arm 12, and an image captured by the camera is transmitted in real time to a display 23 installed in the vicinity of the operator 21 via the control unit 31. The operator 21 can operate the master arm 22 while viewing the image on the display 23 and checking the situation.

In such a master-slave robot remote control system, when the operator 21 who is familiar with the operation operates the robot arm 12, the operation can be performed by the robot arm 12 in an appropriate, reasonable, and sophisticated manner according to the surrounding conditions perceived by the operator 21. In the sense of inheritance of skills acquired by accumulation of experience, it is desired to realize such excellent skills and skills of the operator 21 even in automatic operation.

Therefore, in the present embodiment, as a preparation for realizing the automatic operation, the operation history obtained when the operator 21 who is familiar with the operation causes the robot arm 12 to perform various operations using the robot remote control system of FIG. 1 is acquired as the operation history data (learning operation case data). Examples of the operation to be acquired in the operation history data include, but are not limited to, an operation of inserting a workpiece into another workpiece, an operation of transporting a workpiece, an operation of finding a defect of a workpiece, and the like. The obtained operation history data are stored in an appropriate storage medium such as an HDD provided in the control unit 31.

The operation history data are roughly composed of data indicating a surrounding environment of the operator 21 and data indicating an operation performed by the operator 21 in the surrounding environment.

The data indicating the surrounding environment are data representing the surrounding situation perceivable by the operator 21, and include data on the position of the robot arm 12, data on the position of the workpiece 11, and data on the reaction force detected by the reaction force sensor. The surrounding environment data can be represented as a multi-dimensional vector.

The data of the positions of the robot arm 12 and the workpiece 11 can be obtained by, for example, performing image processing on an image taken by the camera described above. However, the data of the position of the robot arm 12 may be generated based on, for example, the output value of a position sensor (not shown) provided in each joint of the robot arm 12. Since the camera can be regarded as a complex of optical sensors, summarizing the above, the surrounding environment data can be referred to as information acquired by the sensor, i.e., sensor information.

The data indicating the operation performed by the operator 21 include data representing the position of the master arm 22 (in other words, an operation command based on the operation of the operator 21) in time series. This data can be collected by repeating a process in which the control unit 31 monitors the operation command and stores the detected operation command together with time information acquired by a time counting unit (not shown) (for example, a timer) included in the control unit 31. This information can be said to be indicative of a human operation. The data of the operation command can be represented as a multi-dimensional vector.

When a sufficient number of operation history data are obtained, the operation history data are input to a classification system 51 and classified as shown in FIG. 2. The classification system 51 is realized by software for realizing the classification system 51 being installed in an appropriate computer. The software includes a program for implementing the classification step of the present invention.

The classification system 51 classifies a large number of operation history data into a plurality of groups by using, for example, a clustering technique, which is a kind of automatic classification algorithm. The classification here is performed with reference to data indicating the surrounding environment (data indicating the operation command is not included in the classification reference), and in the present embodiment, the classification is performed from the viewpoint of the process of the operation. As the clustering method, for example, an NN method, a K-Means method, a self-organizing map, or the like can be used, but the present invention is not limited thereto. In addition, operation history data can be classified using an automatic classification algorithm other than clustering.

By this classification, it is assumed that the operation history data are classified into N groups of operation history data. The number of groups of the operation history data may be appropriately determined in consideration of the number of the operation history data, the complexity of the operation, the time required for learning to be described later, and the like. In the following description, each group of classified operation history data may be referred to as an operation history of process 1, an operation history of process 2, . . . , but this does not indicate the temporal order of the processes represented by the classified operation history data (for example, this does not indicate that process 2 is performed after process 1).

Next, the operation history data of each group are input to an imitation system (an operation prediction system) 52, and learning is performed. The imitation system 52 is realized by software for realizing the imitation system 52 being installed in an appropriate computer. The software includes a program for realizing the learning step of the present invention. This computer is preferable in that it can efficiently perform machine learning if it has a GPU.

The imitation system 52 includes the same number of imitation models 61 as the number of groups into which the operation history data has been classified by the above-described classification system 51, i.e., N. Essentially, one imitation model 61 corresponds to one of several subdivisions of the technique and skills of the operator 21. Each of the imitation models 61 corresponds to a group of the operation history data classified from the viewpoint of the process of the operation. Each of the imitation models 61 is independent of each other, and learning of the operation history data can be performed individually.

With this configuration, the operation history data of each group (i.e., the operation history of the process 1, the operation history of the process 2, . . . ) are input to the corresponding imitation model 61, and the operation of the operator 21 at that situation is learned. As a technique for this, a known machine learning technique suitable for learning time-series data, for example, a recursive neural network, a state space model, or the like can be used. Through this training phase, a plurality of learned imitation models 61 are constructed in the imitation system 52, and each imitation model 61 can acquire a correlation between the surrounding environment and the operation of the operator 21 at that situation.

As described above, according to the method of the present embodiment, the surrounding situation and the operation to be performed by the skilled operator 21 at that situation are learned based on the operation history data. Therefore, it is unnecessary for a human to understand the operation corresponding to the situation performed by the experienced operator 21 and express by a program, so that labor and cost can be reduced.

In addition, according to the method of the present embodiment, the operation history data are classified into a plurality of groups in advance, and learning is performed while the operation history data are divided by the plurality of imitation models 61, whereby the number of operation history data in which one imitation model 61 learns by machine learning can be reduced. As a result, since the object to be learned by each imitation model 61 can be appropriately limited, the time required for learning can be effectively reduced, and the learned imitation model 61 can be efficiently constructed.

When the learning of the imitation model 61 is completed, the situation shifts to the actual operation. In an automatic operation system (an operation prediction system) 5 as an actual operation system shown in FIG. 3, a classification system 51 and an imitation system 52 are incorporated in a control unit 32 for automatically operating the robot arm 12.

More specifically, the control unit 32 includes, in addition to the imitation system 52, a model selecting unit 35, an evaluation unit 36, and an additional learning unit 37. The model selecting unit 35 includes a classification system 51.

The control unit 32 is configured as a well-known computer like the control unit 31 shown in FIG. 1, and includes a CPU, a ROM, a RAM, an HDD, and the like. In the HDD or the like, various kinds of software are stored by performing an installation operation in advance. The software includes an automatic operation application for implementing automatic operation of the robot arm 12. The automatic operation application includes a program for realizing a model selecting step, a prediction step, an evaluation step, and an additional learning step of the present invention.

By the cooperation of the hardware and software described above, the control unit 32 can function as the classification system 51, the imitation system 52, the model selecting unit 35, the evaluation unit 36, the additional learning unit 37, and the like.

As the classification system 51 included in the model selecting unit 35, the same classification system as the classification system 51 in which the operation history data are classified in FIG. 2 is used. The imitation system 52 also includes a plurality (N) of learned imitation models 61 constructed by the aforementioned training phase.

In actual operation, the data of the position of the robot arm 12, the data of the position of the workpiece 11, and the data of the reaction force detected by the reaction force sensor are input to the classification system 51 provided in the model selecting unit 35. When it is assumed that there are operation history data including the input data (i.e., data indicating the surrounding environment), the classification system 51 determines which of the N groups the operation history data are classified into. The model selecting unit 35 outputs the determination result to the imitation system 52.

In the imitation system 52, one imitation model 61 corresponding to the classified group is selected from the N imitation models 61 based on the classification result input from the model selecting unit 35 (a model selecting step).

Then, in the imitation system 52, the above-mentioned data (data indicating the surrounding environment) are input to the selected imitation model 61, and in response to this, the imitation model 61 outputs an operation predicted to be performed by the operator 21 in this situation (a prediction step). When this operation is input to the robot arm 12 as an operation command, the robot arm 12 can be automatically operated to perform an operation. Further, even in an unknown surrounding environment, if the environment is a surrounding environment similar to the operation history data learned by the imitation model 61 in the past, it is possible to generate an operation command by predicting an appropriate operation.

As a configuration for realizing better automatic operation, the control unit 32 further includes the evaluation unit 36 and the additional learning unit 37.

The evaluation unit 36 appropriately evaluates the result of the actual operation performed by the robot arm 12 in accordance with the operation command given by the control unit 32 (an evaluation step). The evaluation criteria may include the time until the operation is completed, the energy such as the electric power required for the operation, the magnitude of the force applied to the workpiece 11 by the operation, and the like, but the present invention is not limited thereto. In the present embodiment, the evaluation unit 36 performs evaluation based on information such as the above-described position sensor provided in the robot arm 12, but information acquired from the robot arm 12 or a sensor specially provided in the external environment may be used.

The additional learning unit 37 makes the imitation model 61 learn additionally based on the evaluation result obtained by the evaluation unit 36 so that the evaluation unit 36 can output a higher evaluation result (an additional learning step). As this technique, for example, a temporal difference method, a Q-Learning method, or the like known as a reinforcement learning technique can be used.

As a result, since learning is additionally performed even during actual operation of the automatic operation system 5, it is possible to make the robot arm 12 perform a more favorable operation. In addition, it is possible to flexibly cope with changes in the surrounding environment.

It should be noted that when the evaluation standard of the operation or the surrounding environment has changed drastically, it is preferable that the operator 21 is asked to perform a moving method to cope with the change, the operation history data are created, and additional learning is performed on the basis of the created operation history data, in order to obtain a good result at an early stage. Alternatively, additional learning may be performed by using data of an operation that has been highly evaluated.

A step flow diagram summarizing the work described so far is shown in FIG. 4, and the automatic operation system 5 constructed by a series of such work can realize an automatic operation as if operated by the skilled operator 21, at a low cost and in a short time.

As described above, the automatic operation system 5 of the present embodiment includes a plurality of learned imitation models 61 and the model selecting unit 35. The learned imitation models 61 are constructed by machine learning of the operation history data, the operation history data being classified into a plurality of groups by the automatic classification algorithm of the classification system 51, the operation history data belonging to each group being learned by the imitation model 61 corresponding to the group. The operation history data include data indicating a surrounding environment and data indicating an operation of the operator 21 in the surrounding environment. The model selecting unit 35 selects one imitation model 61 from a plurality of the imitation models 61 based on a result of classifying data indicating a given surrounding environment by the automatic classification algorithm of the classification system 51. The automatic operation system 5 inputs data indicating the surrounding environment to the imitation model 61 selected by the model selecting unit 35 to predict an operation of the operator 21 with respect to the surrounding environment.

Further, in the automatic operation system 5 of the present embodiment, the automatic operation is performed by predicting an operation of the operator 21 by the following operation prediction method. That is, the operation prediction method includes a classification step, a learning step, a model selecting step, and a prediction step. In the classification step, the operation history data including data indicating a surrounding environment and data indicating an operation of the operator 21 in the surrounding environment are classified into a plurality of groups by the automatic classification algorithm of the classification system 51. In the learning step, on a computer having a plurality of imitation models 61, each of imitation models 61 corresponding to the group are made to learn the operation history data belonging to each group classified in the classification step, by machine learning, to construct a plurality of learned imitation models 61. In the model selecting step, one imitation model 61 is selected from the plurality of imitation models 61 based on a result of classifying data indicating a given surrounding environment by the automatic classification algorithm of the classification system 51. In the prediction step, data indicating the surrounding environment are input to the imitation model 61 selected in the model selecting step to predict an operation of the operator 21 with respect to the surrounding environment.

As a result, automation can be realized in a short time and at a low cost in a form that properly incorporates the techniques and skills of the skilled operator 21, which may not be suitable for putting into words or expressing in a program.

In the automatic operation system 5 of the present embodiment, the data indicating the surrounding environment may include image data of an image taken by a camera, for example, in addition to the data of the position of the robot arm 12, the data of the position of the workpiece 11, and the data of the reaction force detected by the reaction force sensor.

That is, the automatic operation system 5 of the present embodiment is particularly suitable for automating the operation performed by the operator 21 in a situation which is represented by an image (i.e., a situation in which it is difficult to put into words).

The automatic operation system 5 of the present embodiment predicts an operation of the operator 21 of an operation involving contact with the surrounding environment.

That is, the automatic operation system 5 of the present embodiment is particularly suitable for automating an operation in which the operator 21 perceives a state of contact with the surrounding environment (i.e., a state in which it is difficult to put into words).

The automatic operation system 5 of the present embodiment includes the evaluation unit 36 and the additional learning unit 37. The evaluation unit 36 evaluates a result of the prediction of the operation of the operator 21 output from the imitation model 61 selected by the model selecting unit 35. The additional learning unit 37 makes the learned imitation model 61 learn additionally by machine learning.

This allows additional learning, and therefore better operation can be performed depending on the situation.

Figure 5:
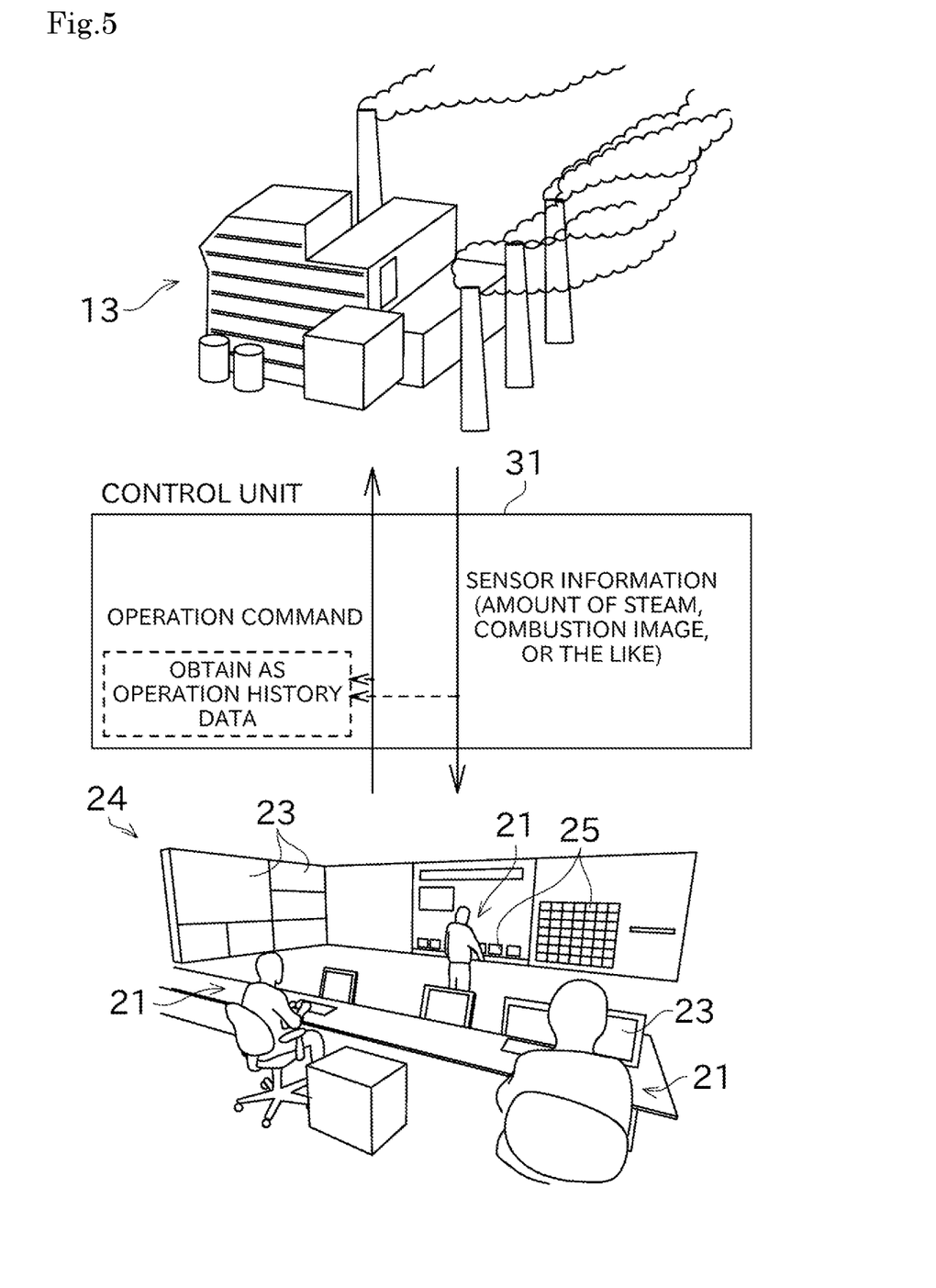
FIG. 5 is a conceptual diagram showing a configuration for collecting operation history data related to an operation of a waste incinerator in an operation system of the waste incinerator.
Figure 6:
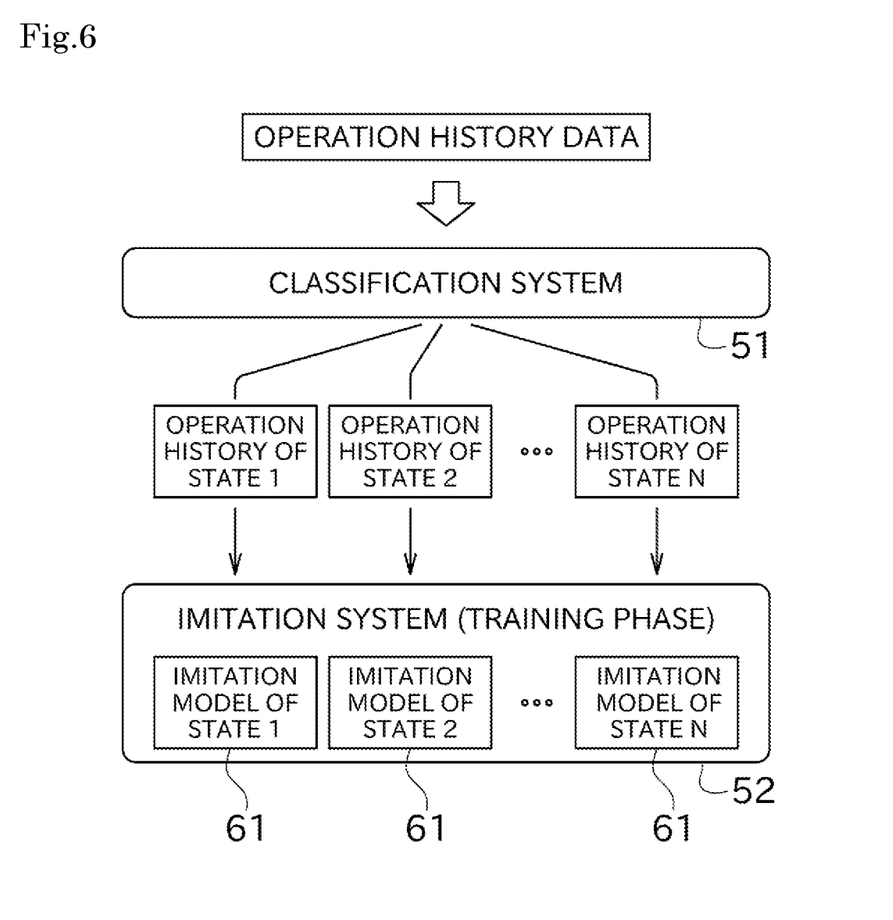
FIG. 6 is a conceptual diagram showing work of classifying operation history data and making corresponding imitation models learn them.
Figure 7:
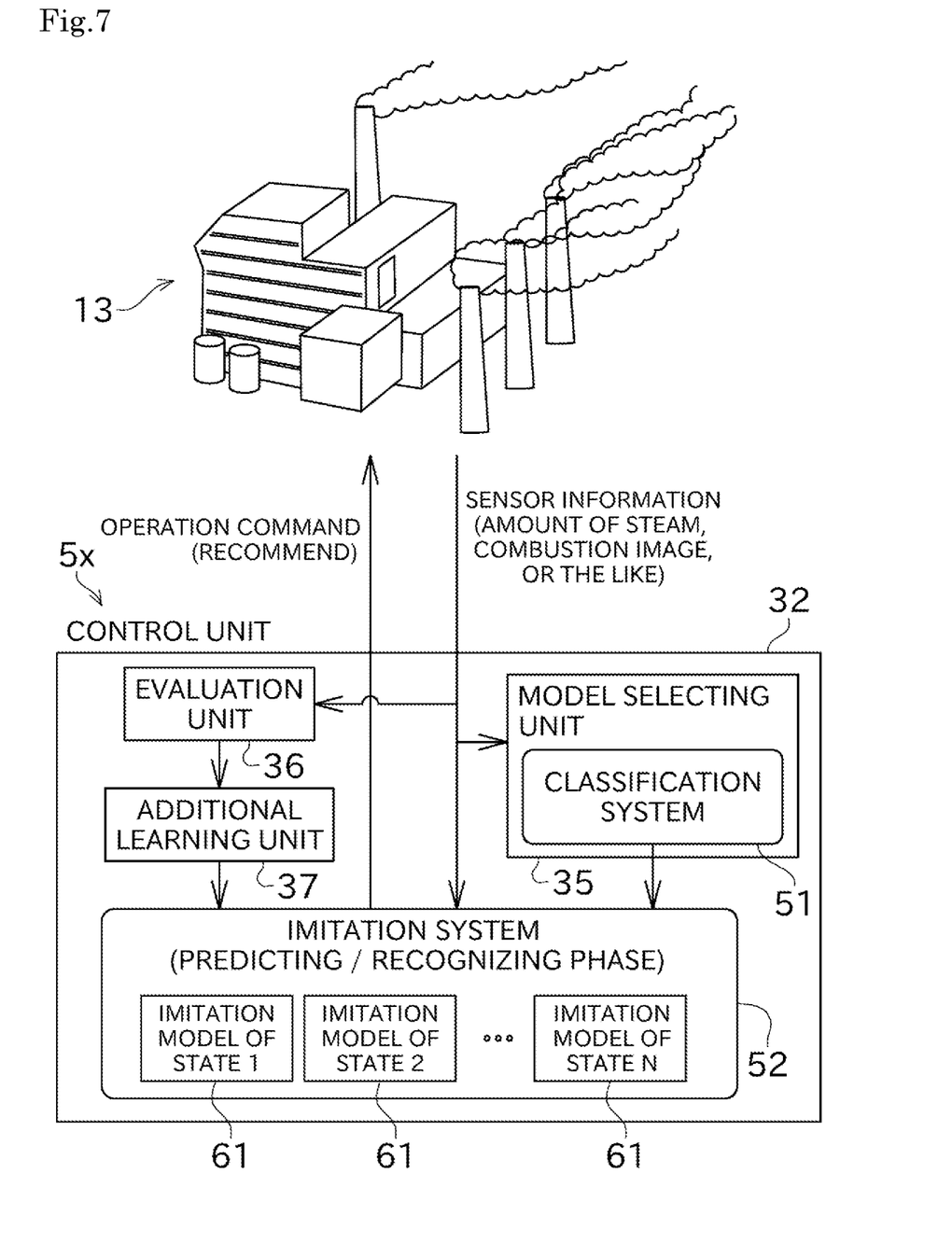
FIG. 7 is a block diagram showing an automatic operation system of the second embodiment.

Next, a second embodiment of the present invention will be described. FIG. 5 is a conceptual diagram showing a configuration for collecting operation history data relating to an operation of a waste incinerator 13. FIG. 6 is a conceptual diagram showing work of classifying the operation history data and making corresponding imitation model 61 learn them. FIG. 7 is a block diagram showing an automatic operation system 5x according to the second embodiment. In the description of the present embodiment, the same or similar members as those of the above-described embodiment are denoted by the same reference numerals in the drawings, and a description thereof may be omitted.

FIG. 5 shows a state in which an operation history of the waste incinerator 13 is acquired by a manual operation of the operator 21 in a control room 24 in order to realize the automatic operation of the waste incinerator 13, which is one type of plant. The operator 21 can instruct the operation of the waste incinerator 13 by operating various devices (for example, switches on an operation panel or the like) disposed in the control room 24.

The waste incinerator 13 is provided with various sensors such as a sensor for detecting the amount of steam and a camera for photographing the state of combustion of the waste as a combustion image, which are not shown in the figure.

The control unit 31 included in the waste incinerator 13 controls the waste incinerator 13 to operate in response to the operation of the operator 21. The control unit 31 controls the display 23, an indicator 25, and the like, so that they display the amount of steam, the combustion image, and the like acquired by the sensor. As a result, also in the present embodiment, an operation accompanied by interaction with the surrounding environment is realized.

When the skilled operator 21 manually operates the waste incinerator, the control unit 31 collects operation history data as learning operation case data and stores the operation history data in the HDD or the like. The operation history data include sensor information (data indicating the surrounding environment) including the steam amount, the combustion image, and the like, and data indicating the operation performed by the operator 21 under such a situation.

Thereafter, as shown in FIG. 6, the collected operation history data are classified into a plurality of groups by the classification system 51 in the same manner as in the first embodiment described above. In the present embodiment, the classification is performed from the viewpoint of the state of the incinerator 13. In the following description, each group of classified operation history data may be referred to as an operation history of state 1, an operation history of state 2, . . . . The operation history data of each group (i.e., the operation history of the state 1, the operation history of the state 2, . . . ) are learned by the corresponding imitation model 61. As a result, a plurality of learned imitation models 61 are constructed, and the imitation models 61 are used in the automatic operation system (an operation prediction system) 5x shown in FIG. 7.

Thereafter, when the waste incinerator 13 is automatically operated, as shown in FIG. 7, the amount of steam, the combustion image, and the like acquired by the sensor are input to the model selecting unit 35, and the model selecting unit 35 selects the imitation model 61 for which the operation prediction is to be performed, in accordance with the classification system 51. Then, in the imitation system 52, the surrounding environment data such as the steam amount and the combustion image acquired by the sensor are input to the selected imitation model 61, and the imitation model 61 outputs an operation predicted to be performed by the operator 21 in the input surrounding environment.

As described above, with respect to the operation of plants such as the waste incinerator 13, by using the automatic operation system 5x, it is possible to realize a good automatic operation system as performed by the skilled operator 21. However, instead of the automatic operation system 5x, the automatic operation suggestion system may be configured as an operation suggestion system that suggests an operation recommended to the operator.

Although a preferred embodiment of the present invention has been described above, the above-described configuration can be modified, for example, as follows.

The data indicating a surrounding environment and the data indicating a human operation are not limited to the above, and various data can be included in the operation history data. For example, the operation history data may include data relating to a state of a tool mounted on the robot arm 12.

In the first embodiment, the classification of the operation history data can be performed from another viewpoint instead of the process. Similarly, in the second embodiment, the classification of the operation history data can be performed from another viewpoint instead of the state.

The computer that causes the imitation model 61 to perform learning and the computer that causes the learned imitation model 61 to perform operation prediction may be the same or different.

The automatic operation system 5 of the first embodiment is not limited to the arm type robot, and can be applied to the operation of other types of robots, or can be applied to the operation of other machines other than robots. Further, the automated operation system 5x of the second embodiment is not limited to waste incinerators, but can be applied to the operation of other types of plants, and can be applied to the operation of other facilities other than plants.

What is claimed is:

1. An operation prediction system comprising:
a plurality of learned operation prediction models constructed by machine learning of leaning operation case data, the learning operation case data being classified into a plurality of groups by an automatic classification algorithm, the learning operation case data belonging to each group being learned by the operation prediction model corresponding to the group, the learning operation case data including data indicating a surrounding environment and data indicating a human operation in the surrounding environment; and
a model selecting unit for selecting one operation prediction model from a plurality of the operation prediction models based on a result of classifying data indicating a given surrounding environment by the automatic classification algorithm; wherein
the data indicating the surrounding environment are input to the operation prediction model selected by the model selecting unit to predict a human operation with respect to the surrounding environment.

2. The operation prediction system according to claim 1, wherein
the data indicating the surrounding environment include image data.

3. The operation prediction system according to claim 1, performing an operation prediction of an operation involving contact with the surrounding environment.

4. The operation prediction system according to claim 1, further comprising:
an evaluation unit for evaluating a result of the prediction of the human operation output from the operation prediction model selected by the model selecting unit; and
an additional learning unit for making the learned operation prediction model learn additionally by machine learning.

5. A robot operation system as the operation prediction system according to claim 1.

6. A plant operation system as the operation prediction system according to claim 1.

7. An operation prediction method comprising:
a classification step for classifying learning operation case data including data indicating a surrounding environment and data indicating a human operation in the surrounding environment into a plurality of groups by an automatic classification algorithm;

a learning step, on a computer having a plurality of operation prediction models, for making each of the operation prediction models corresponding to the group learn the learning operation case data belonging to each group classified in the classification step, by machine learning, to construct a plurality of learned operation prediction models;

a model selecting step of selecting one operation prediction model from the plurality of the operation prediction models based on a result of classifying data indicating a given surrounding environment by the automatic classification algorithm; and a prediction step for inputting data indicating the surrounding environment to the operation prediction model selected in the model selecting step to predict a human operation with respect to the surrounding environment.

8. The operation prediction method according to claim 7, wherein
the data indicating the surrounding environment include image data.

9. The operation prediction method according to claim 7, performing an operation prediction of an operation involving contact with the surrounding environment.

10. The operation prediction method according to claim 7, further comprising:
an evaluation step for evaluating a result of human operation prediction output from the operation prediction model selected in the model selecting step;
an additional learning step for making the learned operation prediction model learn additionally by machine learning.

\* \* \* \* \*